US011526199B2

(12) United States Patent
Symonds et al.

(10) Patent No.: US 11,526,199 B2
(45) Date of Patent: Dec. 13, 2022

(54) REDUNDANT MEMORY FOR UNDERWATER INSTRUMENTATION

(71) Applicant: Teledyne Instruments, Inc., Thousand Oaks, CA (US)

(72) Inventors: Darryl Symonds, San Diego, CA (US); Jerald Mullison, San Marcos, CA (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 673 days.

(21) Appl. No.: 16/547,446

(22) Filed: Aug. 21, 2019

(65) Prior Publication Data

US 2020/0110445 A1 Apr. 9, 2020

Related U.S. Application Data

(60) Provisional application No. 62/742,055, filed on Oct. 5, 2018.

(51) Int. Cl.
  *G06F 1/16* (2006.01)
  *H05K 5/02* (2006.01)
  *G06F 13/28* (2006.01)
(52) U.S. Cl.
  CPC ............ *G06F 1/1656* (2013.01); *G06F 13/28* (2013.01); *H05K 5/02* (2013.01)
(58) Field of Classification Search
  CPC .... G06F 1/1633; G06F 1/1635; G06F 1/1656; G06F 1/1658
  See application file for complete search history.

(56) References Cited

U.S. PATENT DOCUMENTS

| 5,680,579 | A | 10/1997 | Young et al. |
| 7,680,630 | B2 * | 3/2010 | Schmidt .................... B64F 5/60 |
| | | | 702/189 |
| 10,555,436 | B1 * | 2/2020 | Kalyanasundaram ...................... |
| | | | H05K 7/20209 |
| 2002/0153419 | A1 * | 10/2002 | Hall ....................... G06F 1/1632 |
| | | | 235/400 |

(Continued)

OTHER PUBLICATIONS

International Search Report and Written Opinion, Application No. PCT/US19/54866, dated Feb. 5, 2020.

(Continued)

*Primary Examiner* — Anthony Q Edwards
(74) *Attorney, Agent, or Firm* — M.J. Ram and Associates

(57) ABSTRACT

A redundant memory for use with an instrument arranged to acquire and store data while underwater. Such an instrument comprises a main housing which contains instrument electronics that acquires and may process data received from one or more sensors, with a primary memory located within the main housing and arranged to store at least some of the acquired and/or processed data, and a secondary memory which stores a copy of the data stored in the primary memory. The instrumentation may be arranged to write data to the primary and secondary memories contemporaneously in either a burst or continuous mode, or with primary memory backed up to secondary memory periodically and/or in response to the occurrence of a triggering event. The instrument may comprise a second housing within which the secondary memory is located. The main and second housings may be contained within a common enclosure.

15 Claims, 1 Drawing Sheet

(56) References Cited

U.S. PATENT DOCUMENTS

| | | | | |
|---|---|---|---|---|
| 2010/0115217 A1* | 5/2010 | Oh | .................. | G06F 11/1044 |
| | | | | 714/763 |
| 2016/0004283 A1* | 1/2016 | Ganguly | ............. | G06F 11/3058 |
| | | | | 307/118 |
| 2017/0285941 A1* | 10/2017 | Nale | .................. | G06F 13/16 |
| 2018/0162501 A1 | 6/2018 | Peterson et al. | | |

OTHER PUBLICATIONS

Wenzhoefer F, et al., "Tramper", Oceans 2016 MTS/IEEE Monterey, IEEE,Sep. 19, 2016 (Sep. 19, 2016), p. 1-6, XP033014381.

Priede I G, et al., "Autonomous deep-ocean lander vehicles; modular approaches to design and operation", Oceans '98 Conference Proceedings Nice, France Sep. 28-Oct. 1, 1998, New York, NY, USA, IEEE, US, vol. 2, Sep. 28, 1998 (Sep. 28, 1998), p. 1120-1125, XP010311639.

Mora Andres, et al., "Ad-hoc multi-hop underwater optical network for deep ocean monitoring", 2013 Oceans—San Diego, MTS,Sep. 23, 2013 (Sep. 23, 2013), p. 1-5, XP032567614.

* cited by examiner

REDUNDANT MEMORY FOR UNDERWATER INSTRUMENTATION

RELATED APPLICATIONS

This application claims the benefit of provisional patent application No. 62/742,055 to Symonds et al., filed Oct. 5, 2018.

BACKGROUND OF THE INVENTION

Field of the Invention

This invention relates generally to underwater instrumentation, and more particularly to means for storing data acquired by such instrumentation.

Description of the Related Art

Instrumentation deployed underwater is typically used to collect data from the surrounding environment. Such data needs to be stored so that it can later be retrieved. However, there are problems inherent in storing data underwater that can jeopardize its integrity. For example, memory storage devices are improving, but can still become corrupted. Further, underwater instruments, even when perfectly manufactured and expertly deployed, can still be damaged while deployed (by, e.g., heavy equipment operating near offshore energy platforms, activities associated with fisheries (trawling, long-line towing, etc.)). While instruments can be replaced if they fail or are damaged, the data they have gathered before such failure or damage generally cannot. Many measurements taken with these instruments are performed by survey companies, whose payment is most often contingent upon returning a certain minimum amount of data (typically 80%). These measurements are expensive to perform, so losing data can result in a significant financial loss. Typical deployments can take 6 months to a year, so needing to redo a deployment due to data loss carries a tremendous time and money penalty.

There are several potential failure points that are unique to oceanographic instruments. For example, by the very nature of the instruments, the user must periodically open a pressure housing to replace the batteries. It is common, though not universal, for this pressure housing to contain sensor electronics and memory. With every opening and closing of a pressure housing, there is the potential to introduce a leak: o-rings can be damaged, o-ring grooves can be obstructed or damaged, etc. There is also a significant potential for physical damage to oceanographic instruments deployed near heavy equipment, particularly in the offshore energy environment. Such instruments, when on or near the ocean surface, are at risk of being struck by vessels.

SUMMARY OF THE INVENTION

A redundant memory for underwater instrumentation is presented which addresses several of the problems noted above.

The present memory is intended for use with an instrument arranged to acquire and store data while underwater. Such an instrument comprises a main housing which contains instrument electronics that acquires and may process data received from one or more sensors. The instrument further comprises a primary memory located within the main housing and arranged to store at least some of the acquired and/or processed data, and a secondary memory which stores a copy of the data stored in the primary memory.

The instrumentation may be arranged to write data to the primary and secondary memories contemporaneously in either a burst or continuous mode, or with primary memory backed up to secondary memory periodically and/or in response to the occurrence of a triggering event.

The instrument may comprise a second housing within which the secondary memory is located. The main and second housings, which may be pressure housings, may be contained within a common enclosure.

In one embodiment, the primary memory is a fixed memory and the secondary memory is a removable memory. The main housing may be arranged such that the primary memory is inaccessible, and the second housing may be arranged such that the secondary memory is accessible. One or more batteries may be located within the second housing and used to power the secondary memory.

These and other features, aspects, and advantages of the present invention will become better understood with reference to the following drawings, description, and claims.

DETAILED DESCRIPTION OF THE INVENTION

The present memory system provides a redundant copy of data gathered during an underwater deployment of an instrument which typically includes one or more sensors and is arranged to acquire and may process data acquired from the sensors. Such data can include, but is not limited to, raw sensor data, processed on-board data, diagnostic data, and all other data useful for post-deployment analysis. A full copy of the data is stored in a primary memory, and redundantly in a secondary memory, which serves to provide protection against device and/or memory device errors or failures.

Figure 1:
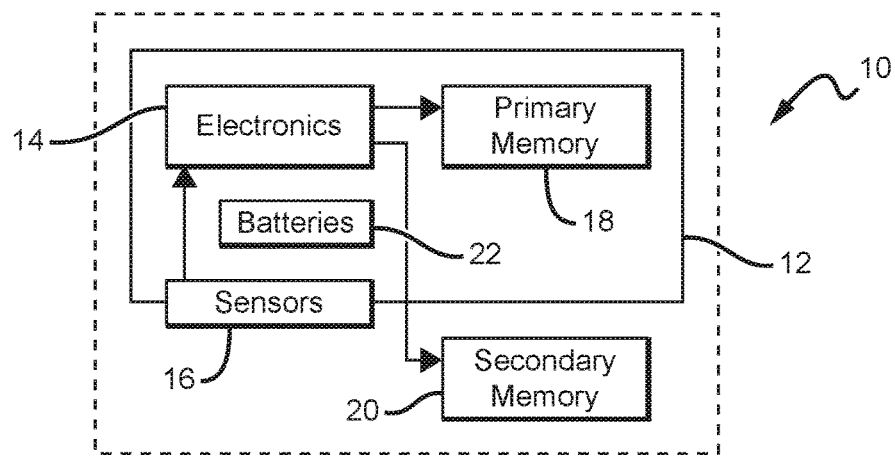
FIG. 1 is a block diagram of one possible embodiment of an instrument that includes redundant memory per the present invention.

A basic block diagram of the present system is shown in FIG. 1. An instrument 10 as described herein includes a main housing 12 which contains instrument electronics 14 which acquires and may process data received from one or more sensors 16, and a primary memory 18 located within the main housing and arranged to store at least some of the acquired and/or processed data. Instrument 10 also includes a secondary memory 20 which stores a copy of the data stored in primary memory 18. Batteries 22 would typically be enclosed within housing 12 to power the instrument.

In a typical application, instrument 10 performs a plurality of measurements, typically using one or more sensors 16 arranged to interact with the underwater environment outside of main housing 12. One way in which the instrument can be arranged is such that the resulting data is written to primary memory 18 and to secondary memory 20 contemporaneously. The data may be written to the memories in several different ways. For example, data may be written in a burst mode, with each burst comprising data associated with a predetermined number of measurements. Another possible arrangement is to have instrument 10 write data to the memories in a continuous mode, with each write comprising data associated with one of the measurements.

Alternatively, instrument 10 can be arranged such that data written to primary memory 18 is periodically backed up to secondary memory 20. Data stored in primary memory 18 might also be backed up to secondary memory 20 upon the occurrence of a triggering event, such as leak detection in main housing 12.

Figure 2:
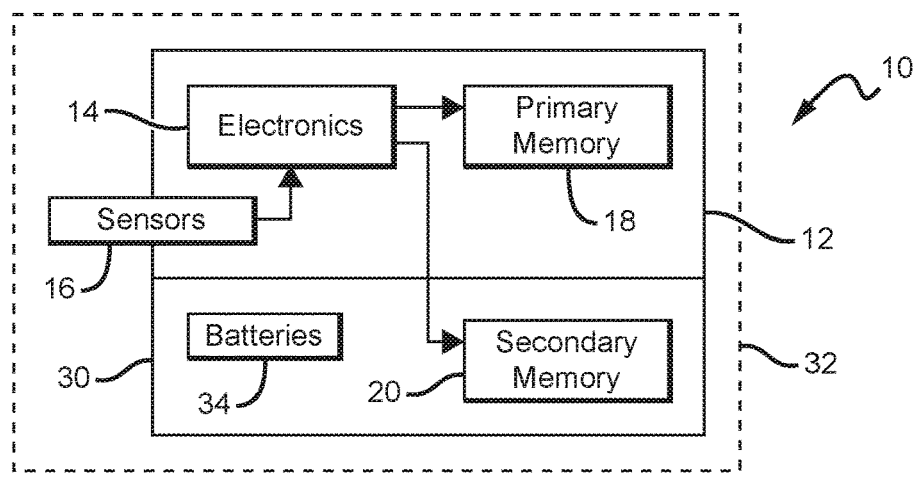
FIG. 2 is a block diagram of another possible embodiment of an instrument that includes redundant memory per the present invention.

As shown in FIG. 2, instrument 10 may further comprise a second housing 30 in which secondary memory 20 is contained. The main and second housings 12, 30 may be contained within a common enclosure 32. Both main housing 12 and second housing 30 are preferably pressure housings. By placing the primary and secondary memories in separate housings in this way, data is protected in the event of a catastrophic failure—for example, if one of the housings becomes flooded and damages the memory it contains, the stored data will still be retrievable from the memory contained within the other housing.

Main housing 12 may be arranged such that primary memory 18 is inaccessible, and second housing 30 may be arranged such that secondary memory 20 is accessible. One or more batteries 34, which may be used to power, for example, the electronics, sensors, primary memory 18 and/or secondary memory 20, may be located within second housing 30 such that they are also accessible and thus easily replaced. In this way, opening accessible housing 30 to replace the batteries—which is typically necessitated between deployments—also allows secondary memory 20 to be quickly off-loaded. This arrangement allows main housing 12 to remain sealed between deployments.

Thus, the present system takes steps to provide two copies of all valuable data, on separate hardware and in separate pressure housings (if so configured). This serves to greatly improve the odds of recovering the data stored during any deployment in which the hardware has not been completely lost.

Figure 3:
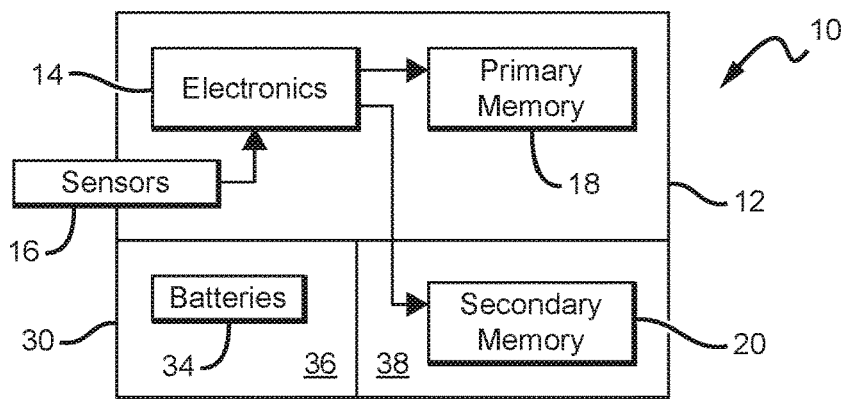
FIG. 3 is a block diagram of another possible embodiment of an instrument that includes redundant memory per the present invention.

As illustrated in FIG. 3, second housing 30 may be divided into at least two pressure compartments 36, 38, with batteries 34 located within one of the pressure compartments (36) and secondary memory 20 located within the other pressure compartment (38). In this configuration, data is protected even if main housing 12 and pressure compartment 36 floods. If second housing 38 is made accessible, secondary memory 20 can be removed or accessed; in this case, primary memory 18 can be a fixed memory and secondary memory 20 can be a removable memory. If removed, secondary memory 20 can be plugged into an external reader. Alternatively, second housing 38 can be opened and secondary memory 20 read directly.

The primary and secondary memories are preferably non-volatile. The instrument typically includes a microprocessor (not shown) to write all data to both memories. Data can preferably be read from either memory via a serial or Ethernet connection, with Ethernet assumed to be preferred for higher speeds. In one embodiment, secondary memory 20 is made removable, and will be removed and read directly with a card reader, with data downloaded—preferably via Ethernet—only if the removable memory has failed. A software utility may be provided to perform a comparison of the primary and secondary memories, to inform the user as to any discrepancies, and to provide possible resolution paths, immediately upon connecting to the instrument post-deployment.

The primary and secondary memories may take the same form, though this is not essential. At least one of the primary and secondary memories can comprise one or more MicroSD cards and/or one or more removable USB sticks. For example, secondary memory 20 can be a removable USB stick in a user-accessible pressure compartment, and a different type of non-volatile memory, such as a MicroSD card, can be in an inaccessible compartment.

In one possible embodiment, all data are written to both primary and secondary memory locations simultaneously. A microprocessor will process the data and write the processed and raw (unprocessed) data to both memory locations. There are at least two deployment scenarios contemplated: burst and continuous. In a burst scenario, a user-defined number of pings (or measurements over a user defined timeframe) will be collected, processed, and then written. In a continuous scenario, every measurement will be individually processed and written.

Alternatively, the removable secondary memory could be written to on a scheduled basis, which could be, for example, hourly or daily. Should a leak be detected in this scenario, then all data collected in anticipation of the next scheduled write should be written immediately.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. An instrument arranged to acquire and process data while underwater, comprising:
   a main housing;
   instrument electronics located within said main housing which acquires and processes data received from one or more sensors;
   a primary memory located within said main housing and arranged to store at least some of said acquired and/or processed data received from said one or more sensors; and
   a secondary memory which stores a copy of the data stored in said primary memory;
   wherein data are written to said primary memory and to said secondary memory contemporaneously.

2. The instrument of claim 1, wherein said instrument performs a plurality of measurements, said instrument arranged to write data to said memories in a burst mode, each burst comprising data associated with a predetermined number of measurements.

3. The instrument of claim 1, wherein said instrument performs a plurality of measurements, said instrument arranged to write data to said memories in a continuous mode, each write comprising data associated with one of said measurements.

4. The instrument of claim 1, wherein at least one of said primary and secondary memories comprises one or more MicroSD cards and/or one or more removable USB sticks.

5. The instrument of claim 1, wherein said primary memory is a fixed memory and said secondary memory is a removable memory.

6. An instrument arranged to acquire and process data while underwater, comprising:
   a main housing;
   instrument electronics located within said main housing which acquires and processes data received from one or more sensors;

a primary memory located within said main housing and arranged to store at least some of said acquired and/or processed data;

a secondary memory which stores a copy of the data stored in said primary memory; and a second housing, said secondary memory located within said second housing.

7. The instrument of claim 6, wherein said main housing and said second housing are contained within a common enclosure.

8. The instrument of claim 6, wherein said main housing and said second housing are pressure housings.

9. The instrument of claim 6, wherein said main housing is such that said primary memory is inaccessible, and said second housing is such that said secondary memory is accessible.

10. The instrument of claim 6, said further comprising one or more batteries located within said second housing.

11. The instrument of claim 6, wherein said one or more batteries provide power to said secondary memory.

12. The instrument of claim 6, wherein said second housing is divided into at least two pressure compartments, further comprising one or more batteries located within one of said pressure compartments and said secondary memory located within another of said pressure compartments.

13. The instrument of claim 6, wherein data stored in said primary memory is periodically backed up to said secondary memory.

14. The instrument of claim 6, arranged such that data stored in said primary memory are backed up to said secondary memory upon the occurrence of a triggering event.

15. An instrument arranged to acquire and process data while underwater, comprising:

a main pressure housing;

a second pressure housing;

instrument electronics located within said main housing which acquires and processes data received from one or more sensors;

a fixed memory located within said main pressure housing and arranged to store at least some of said acquired and/or processed data;

a removable memory located within said second pressure housing which stores a copy of the data stored in said fixed memory; and one or more batteries located with said second pressure housing which provide power to said removable memory;

wherein said main housing is such that said fixed memory is inaccessible, and said second housing is such that said removable memory is accessible.

* * * * *